United States Patent
Koizumi et al.

(10) Patent No.: US 8,661,492 B2
(45) Date of Patent: Feb. 25, 2014

(54) COMMUNICATION APPARATUS, CONTROL METHOD, AND COMPUTER READABLE RECORDING MEDIUM

(75) Inventors: Hidetaka Koizumi, Kawasaki (JP); Tatsuya Kimoto, Tokyo (JP); Koji Ogaki, Koza-gun (JP)

(73) Assignee: Canon Kabushiki Kaisha, Tokyo (JP)

(*) Notice: Subject to any disclaimer, the term of this patent is extended or adjusted under 35 U.S.C. 154(b) by 312 days.

(21) Appl. No.: 12/854,383

(22) Filed: Aug. 11, 2010

(65) Prior Publication Data

US 2011/0047586 A1 Feb. 24, 2011

(30) Foreign Application Priority Data

Aug. 18, 2009 (JP) .................................. 2009-189336

(51) Int. Cl.
*H04N 7/173* (2011.01)
(52) U.S. Cl.
USPC ................. 725/118; 725/98; 725/99; 725/110
(58) Field of Classification Search
USPC .................................. 725/80, 110, 118, 98–99
See application file for complete search history.

(56) References Cited

U.S. PATENT DOCUMENTS

| 2008/0080596 A1* | 4/2008 | Inoue et al. ..................... 375/211 |
| 2009/0157885 A1* | 6/2009 | Takatsuji et al. ............... 709/228 |
| 2009/0193490 A1* | 7/2009 | Stone et al. .................... 725/151 |

FOREIGN PATENT DOCUMENTS

JP 2006-203725 A 8/2006

* cited by examiner

*Primary Examiner* — Mulugeta Mengesha
(74) *Attorney, Agent, or Firm* — Canon USA, Inc. IP Division (57) ABSTRACT

A communication apparatus includes a communication unit, an acquisition unit, and a control unit. The control unit controls the acquisition unit to acquire again information for generating video data to be transmitted to an external apparatus by the communication unit from an apparatus if the predetermined signal is detected, the predetermined signal indicates that a state of the apparatus is changed to a first state from a second state after the state of the apparatus is changed to the second state from the first state.

18 Claims, 5 Drawing Sheets

COMMUNICATION APPARATUS, CONTROL METHOD, AND COMPUTER READABLE RECORDING MEDIUM

BACKGROUND OF THE INVENTION

1. Field of the Invention

The present invention relates to a communication apparatus that communicates with an external apparatus, a control method therefor, and a computer-readable recording medium storing.

2. Description of the Related Art

Recently, a communication system which complies with a high definition multimedia interface (HDMI®) standard (hereinafter simply referred to as an "HDMI system") has been proposed. An HDMI system includes a source apparatus, a sink apparatus, and a repeater apparatus. A source apparatus transmits video data and audio data. A sink apparatus includes a display unit that displays video data transmitted from the source apparatus. A repeater apparatus transmits video data and audio data received from the source apparatus to the sink apparatus.

In an HDMI system in which a source apparatus is connected to a repeater apparatus, when the repeater apparatus is powered on, the source apparatus acquires extended display identification data (EDID), which is recorded on the repeater apparatus, from the repeater apparatus. In addition, in order to transmit video data and audio data that conform to the specification of the repeater apparatus to the repeater apparatus, the source apparatus changes a setting of the video data and the audio data according to the information included in the EDID acquired from the repeater apparatus.

Japanese Patent Application Laid-Open No. 2006-203725 discusses an HDMI system in which a source apparatus compares manufacturer information included in an EDID acquired from a repeater apparatus and manufacturer information which is already recorded on the source apparatus and changes a setting of data based on a result of the comparison.

If the manufacturer information included in the EDID recorded on the source apparatus matches the manufacturer information included in the EDID acquired from the repeater apparatus, then the above-described conventional source apparatus determines that the same information is included in the EDID and does not change the setting of the data.

On the other hand, another repeater apparatus transmits an EDID of the repeater apparatus itself to the source apparatus as it is according to a status of connection between the repeater apparatus and an external apparatus. In addition, yet another repeater apparatus combines an EDID acquired from an external apparatus with an EDID of the repeater apparatus itself and transmits the updated (combined) EDID that includes capabilities of the external apparatus to the source apparatus.

Accordingly, on the source apparatus, even if the manufacturer information included in the EDID acquired from the repeater apparatus and the manufacturer information included in the already recorded EDID match each other, the information included in the acquired EDID and the information included in the recorded EDID may be different from each other.

In this case, the source apparatus may transmit the video data and audio data whose setting has been set according to the information included in the recorded EDID to the repeater apparatus without changing the setting of the data according to the information included in the acquired EDID. Accordingly, in this case, the repeater apparatus which can update the EDID may not receive video data and audio data that conform to the specification of the repeater apparatus.

SUMMARY OF THE INVENTION

According to an aspect of the present invention, there is provided a communication apparatus, comprising: a communication unit that transmits video data to an external apparatus via an apparatus; an acquisition unit that acquires first information from the apparatus, the first information includes information for generating video data; and a control unit that determines whether a predetermined signal is detected, the predetermined signal indicates that a state of the apparatus is changed to a first state from a second state after the state of the apparatus is changed to the second state from the first state, wherein the control unit controls the acquisition unit to acquire second information from the apparatus, if the predetermined signal is detected, the second information includes information for generating video data, wherein the first state is a state that the apparatus does not receive video data transmitted from the communication unit, and wherein the second state is a state that the apparatus receives video data transmitted from the communication unit.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

FIG. 2 (including FIG. 2A and FIG. 2B) illustrates an exemplary configuration of the communication system according to the first exemplary embodiment of the present invention.

DESCRIPTION OF THE EMBODIMENTS

Various exemplary embodiments, features, and aspects of the present invention will be described in detail below with reference to the attached drawings.

Figure 1:
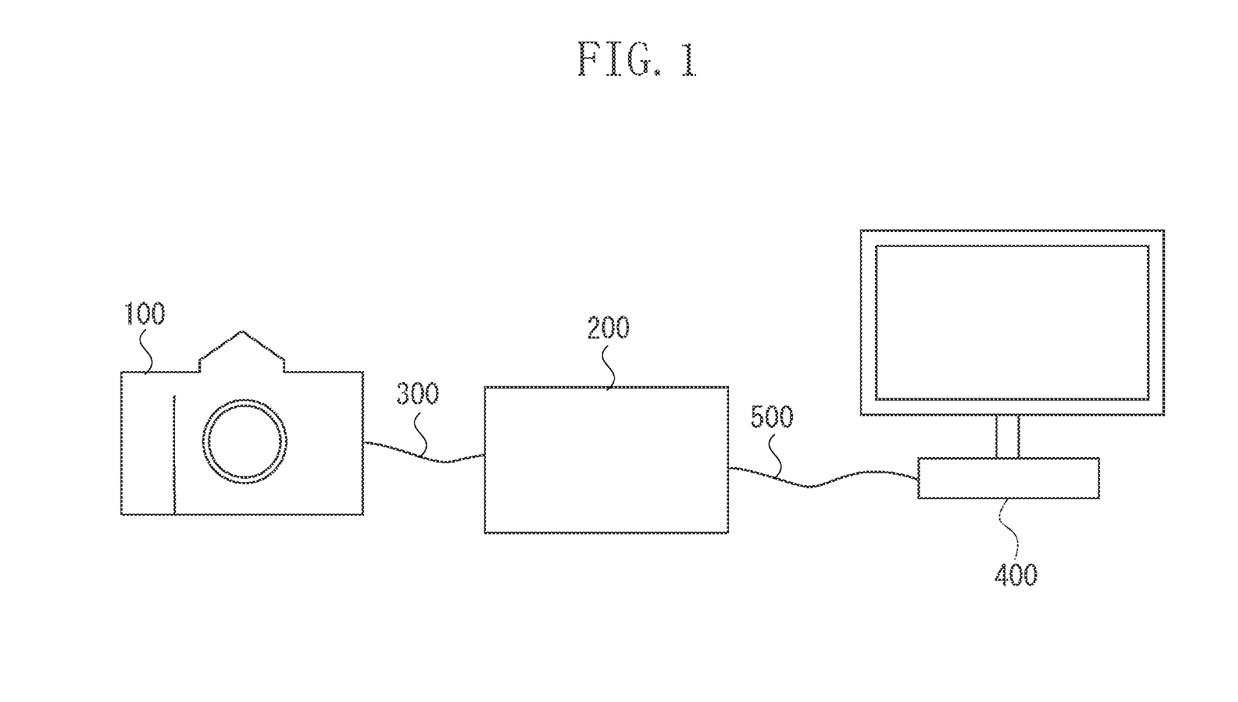
FIG. 1 illustrates an example of a communication system according to a first exemplary embodiment of the present invention.

A first exemplary embodiment of the present invention will now be described in detail below. FIG. 1 illustrates an example of a communication system according to the present exemplary embodiment. Referring to FIG. 1, the communication system according to the present exemplary embodiment includes a communication apparatus 100, a repeater apparatus 200, connection cables 300 and 500, and an external apparatus 400.

The connection cable 300 is connected to the communication apparatus 100 and the repeater apparatus 200 to physically connect the communication apparatus 100 and the repeater apparatus 200 via the connection cable 300. The connection cable 500 is connected to the repeater apparatus 200 and the external apparatus 400 to physically connect the repeater apparatus 200 and the external apparatus 400 via the connection cable 500.

The communication apparatus 100 is a video output apparatus capable of transmitting video data, audio data, and auxiliary data to the external apparatus 400 via the connection cable 300, the repeater apparatus 200, and the connection cable 500. The repeater apparatus 200 transmits the video data and audio data received from the communication apparatus 100 via the connection cable 300 to the external apparatus 400 via the connection cable 500.

The external apparatus 400 is a display and output apparatus that displays, on a display unit, video data received from the communication apparatus 100 via the connection cable 300, the repeater apparatus 200, and the connection cable 500. In addition, the external apparatus 400 outputs audio data received from the communication apparatus 100 from a speaker unit (not illustrated).

In the first exemplary embodiment described above, the communication apparatus 100, the repeater apparatus 200, the external apparatus 400, and the connection cables 300 and 500 conform to the HDMI standard. Accordingly, the communication apparatus 100 is a source apparatus that functions as an HDMI source in the HDMI standard. In addition, the repeater apparatus 200 is an apparatus that functions as an HDMI repeater in the HDMI standard. Furthermore, the external apparatus 400 is a sink apparatus that functions as an HDMI sink in the HDMI standard.

In the present exemplary embodiment, a single-lens reflex camera is used as an example of the communication apparatus 100. However, the present exemplary embodiment is not limited to this. More specifically, it is also useful if any video output apparatus having a function of an HDMI source apparatus, such as a digital still camera, a video camera, a recorder, or a digital versatile disk (DVD) player, is used as the communication apparatus 100.

In the present exemplary embodiment, an audio-visual (AV) amplifier (hereinafter referred to as an "amplifier") is used as an example of the repeater apparatus 200. However, the present exemplary embodiment is not limited to this. More specifically, it is also useful if any apparatus having the function as an HDMI repeater apparatus is used as the repeater apparatus 200.

In the present exemplary embodiment, a television receiving apparatus is used as an example of the external apparatus 400. However, the present exemplary embodiment is not limited to this. More specifically, it is also useful if a data output apparatus having the function of an HDMI sink apparatus, such as a projector or a personal computer (PC), is used as the external apparatus 400.

Figure 2A:
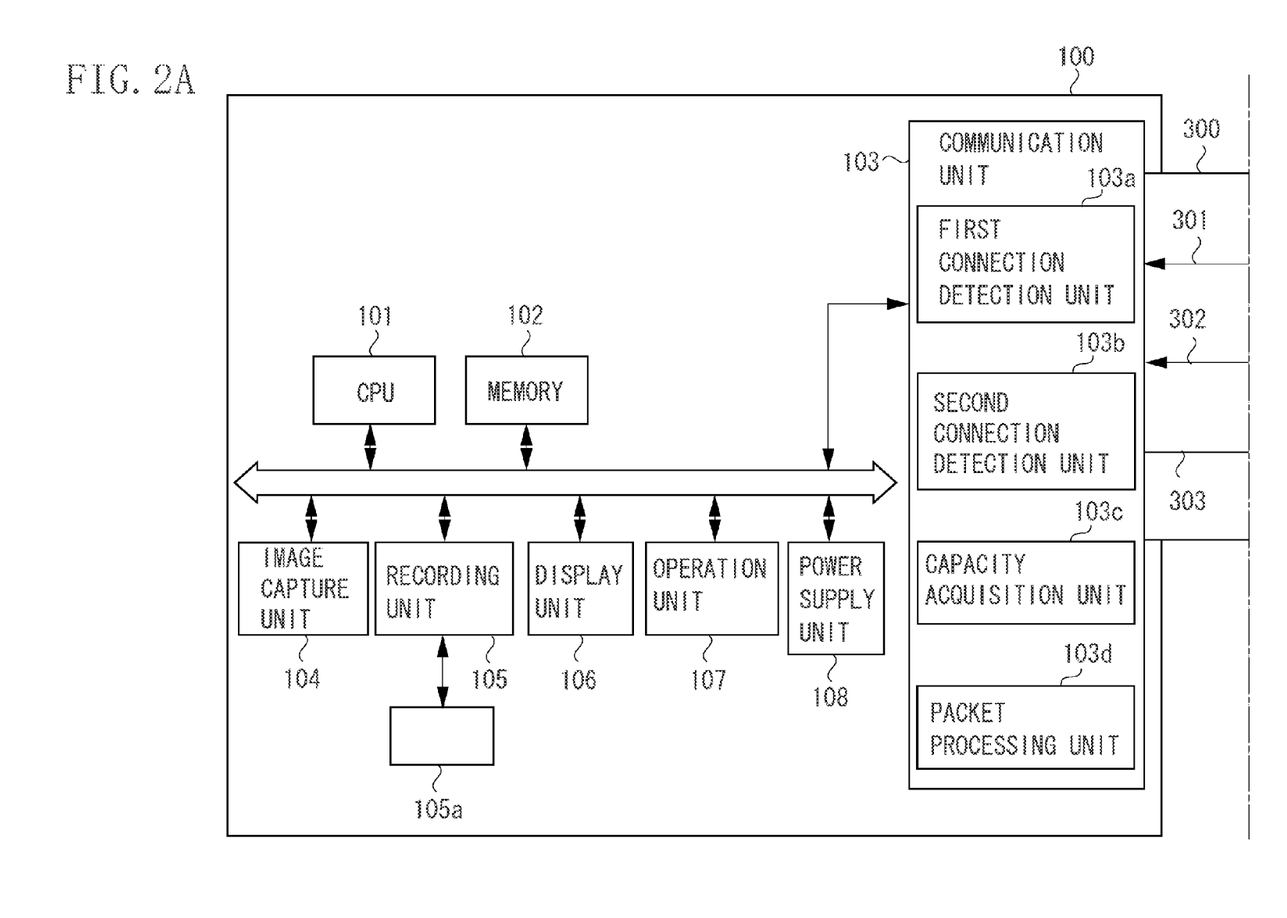
Figure 2B:
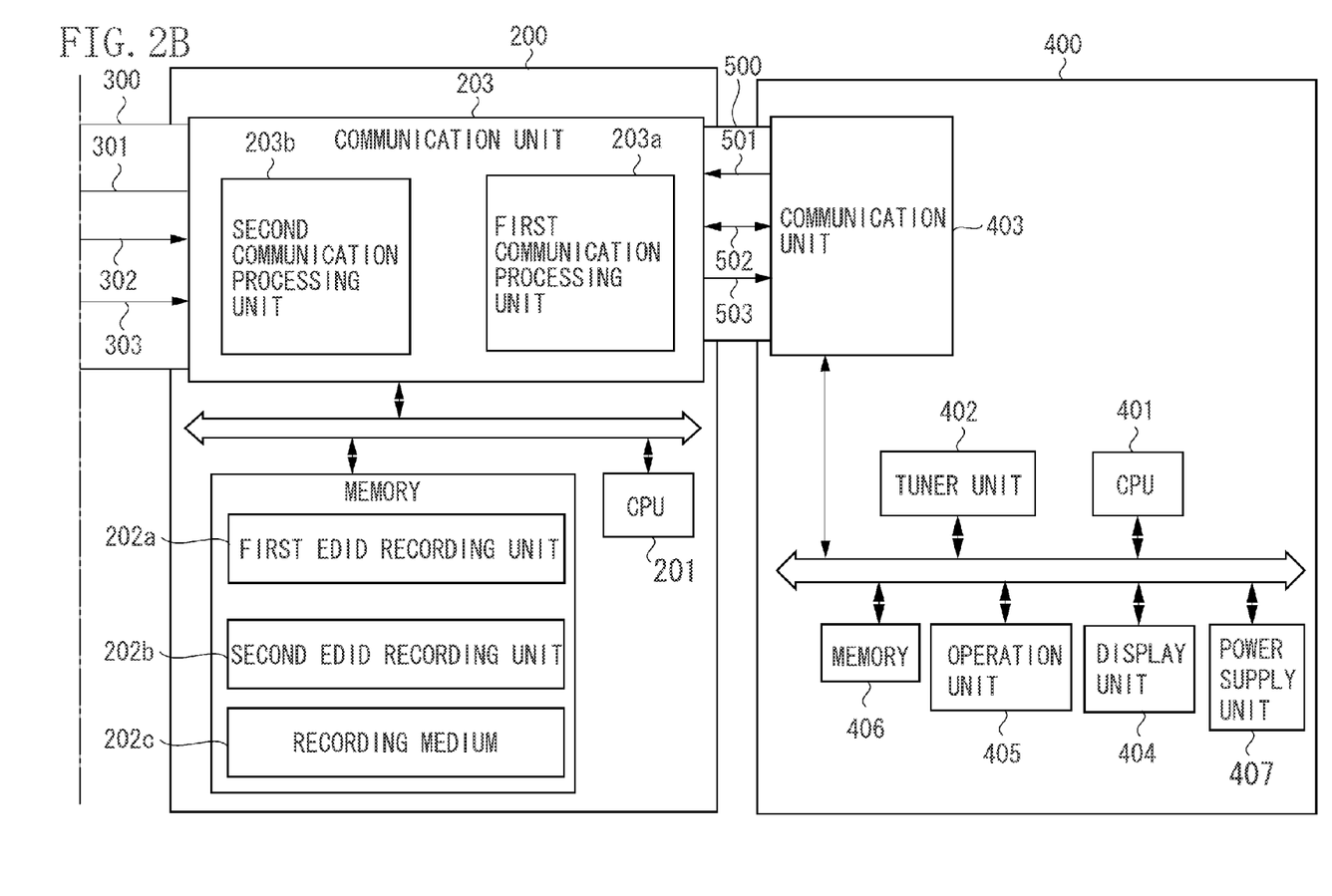

In the following description, the communication apparatus 100 is referred to as a "camera 100". The repeater apparatus 200 is referred to as an "amplifier 200". In addition, the external apparatus 400 is referred to as a "TV 400". The connection cables 300 and 500 are referred to as "HDMI cables 300 and 500". FIG. 2 (including FIG. 2A and FIG. 2B) is a block diagram illustrating an example of the camera 100, the amplifier 200, and the TV 400 according to the present exemplary embodiment.

Now, the HDMI cable 300 will be described in detail below with reference to FIG. 2. Referring to FIG. 2, the HDMI cable 300 includes a +5 V power line, a hot plug detect (HPD) line 301, and a display data channel (DDC) line 302. In addition, the HDMI cable 300 includes a transition minimized differential signaling (TMDS) line 303 and a consumer electronics control (CEC) line.

The +5 V power line is a power supply line for supplying a +5 V power from the camera 100 to the amplifier 200. The HPD line 301 is a transmission line for transmitting an HPD signal of a high voltage level (hereinafter referred to as a "level H") or a low voltage level (hereinafter referred to as a "level L") from the amplifier 200 to the camera 100.

If the camera 100 supplies the +5 V power to the amplifier 200 via the +5 V power line, the amplifier 200 determines whether device information about the TV 400, which is acquired by the amplifier 200 from the TV 400, or device information about the amplifier 200 can be transmitted to the camera 100.

The "device information about the TV 400" is EDID or enhanced EDID (E-EDID) of the TV 400. Both the EDID and the E-EDID is device information about the TV 400. In addition, both the EDID and E-EDID includes information about the TV 400, such as identification information about the TV 400 and the display or audio capacity of the TV 400. More specifically, the EDID and the E-EDID include information about the resolution, the scanning frequency, the aspect ratio, and the color space of the TV 400.

The E-EDID is data that is an expansion of the EDID. The E-EDID includes capacity information more than that included in the EDID. In other words, the E-EDID includes information about the format of the video data and the audio data that the TV 400 supports. In the following description, the EDID and the E-EDID is collectively referred to as "EDID". The device information about the amplifier 200 is EDID described above as the device information about the TV 400.

If the +5 V power is supplied from the camera 100 to the amplifier 200 and if the amplifier 200 can transmit the EDID to the camera 100, the amplifier 200 transmits an HPD signal of level H to the camera 100 via the HPD line 301. By transmitting the HPD signal of level H to the camera 100, the amplifier 200 can notify the camera 100 that the camera 100 can acquire EDID from the amplifier 200.

In some cases, the amplifier 200 cannot transmit EDID to the camera 100 when the camera 100 supplies the +5 V power to the amplifier 200. This is due to the following reason. More specifically, in this case, the setting of the video data, the resolution, or the audio data, which is included in the EDID, has been changed. Furthermore, in this case, the amplifier 200 has combined the EDID of the TV 400 and the EDID of the amplifier 200 and has updated the information included in the EDID of the TV 400.

In this case, the HPD signal of levels L are continuously transmitted to the camera 100 via the HPD line 301 until the updating of the EDID by the amplifier 200 is completed. After the updating of the EDID is completed, the amplifier 200 transmits the HPD signal of level H to the camera 100 via the HPD line 301. In addition, if the camera 100 is not supplying the +5 V power to the amplifier 200, the amplifier 200 transmits the HPD signal of level L to the camera 100.

The DDC line 302 is a transmission line for transmitting the EDID from the amplifier 200 to the camera 100. After receiving the EDID, the camera 100 refers to the EDID acquired from the amplifier 200. Thus, the camera 100 can automatically recognize the display capacity and the audio capacity of the TV 400 or the amplifier 200.

In addition, a central processing unit (CPU) 101 of the camera 100 can automatically recognize the video format and the audio format that conform to the display capacity and the audio capacity of the TV 400 and the amplifier 200. By setting the camera 100 according to the acquired EDID, the camera 100 can generate the video data and audio data that are compliant with the format of the output from the TV 400 or the amplifier 200.

The TMDS line 303 is a transmission line for transmitting video data, audio data, and auxiliary data to the amplifier 200 from the camera 100. The TMDS line 303 includes a TMDS channel 0, a TMDS channel 1, a TMDS channel 2, and a TMDS clock channel.

Now, the HDMI cable 500 will be described in detail below with reference to FIG. 2. In the following description, the detailed description of the configuration of the HDMI cable 500 that is similar to that of the HDMI cable 300 will not be repeated and only points in difference from the HDMI cable 300 will be described.

The HDMI cable 500 includes a +5 V power line, an HPD line 501, a DDC line 502, and a TMDS line 503. The +5 V power line is a power supply line for supplying the +5 V power from the amplifier 200 to the TV 400. The HPD line 501 is a transmission line for transmitting an HPD signal of level H or an HPD signal of level L from the TV 400 to the amplifier 200. If the amplifier 200 supplies the +5 V power to the TV 400 via the +5 V power line, the amplifier 200 determines whether the EDID of the TV 400 can be acquired from the TV 400.

The DDC line 502 is a transmission line for transmitting the EDID of the TV 400 from the TV 400 to the amplifier 200. The TMDS line 503 is a transmission line for transmitting the video data, the audio data, and auxiliary data, which the amplifier 200 has received from the camera 100, to the TV 400.

Now, an exemplary configuration of the camera 100 will be described in detail below with reference to FIG. 2. Referring to FIG. 2, the camera 100 includes the CPU 101, a memory 102, a communication unit 103, an image capture unit 104, a recording unit 105, a display unit 106, an operation unit 107, and a power supply unit 108. The components of the camera 100 will be described in detail below.

The CPU 101 controls the operation of the entire camera 100 according to a computer program stored on the memory 102. The CPU 101 is also capable of controlling the operation of the entire camera 100 according to the EDID acquired from the amplifier 200.

In addition, the CPU 101 controls the operation of the entire camera 100 according to a result of an analysis of data supplied from each component of the camera 100. In addition, the CPU 101 executes control of the power supply unit 108 for supplying power to or suspending power supply to each unit.

The memory 102 functions as a work area of the CPU 101. Various information, such as the EDID acquired from the amplifier 200 or identification information of the amplifier 200 or the TV 400, is stored on the memory 102. In addition, the memory 102 also records the setting of a flag for the operation of each component and a result of calculation or analysis executed by the CPU 101. The work area of the CPU 101 is not limited to the memory 102. More specifically, it is also useful if an external storage device, such as a hard disk drive (HDD), is used as the work area of the CPU 101.

The communication unit 103 includes a connection terminal for connecting the HDMI cable 300. The communication unit 103 acquires the EDID from the amplifier 200 via the connection terminal. In addition, the communication unit 103 transmits video data, audio data, and auxiliary data via the connection terminal. Furthermore, the communication unit 103 includes a first connection detection unit 103a, a second connection detection unit 103b, a capacity acquisition unit 103c, and a packet processing unit 103d.

The first connection detection unit 103a can receive the HPD signal transmitted from the amplifier 200 via the HPD line 301. If the HPD signal received via the HPD line 301 has varied from an HPD signal of level H to an HPD signal of level L, then the first connection detection unit 103a notifies the CPU 101 that the level of the HPD signal has varied from the level H to the level L.

Similarly, if the HPD signal received via the HPD line 301 has varied from an HPD signal of level L to an HPD signal of level H, then the first connection detection unit 103a notifies the CPU 101 that the level of the HPD signal has varied from the level L to the level H. If the transmission of the HPD signal received from the CPU 101 is requested, the first connection detection unit 103a supplies the HPD signal to the CPU 101.

The second connection detection unit 103b is capable of continuously determining whether the TMDS line 303 has been connected to a terminal resistor of the amplifier 200 in order to detect the presence of the amplifier 200. In the present exemplary embodiment, information so-called "receiver sense" (hereinafter referred to as "RX sense") is used as information that is the basis of determining whether the TMDS line 303 has been connected to the terminal resistor of the amplifier 200.

RX sense includes RX sense of level H and RX sense of level L. The RX sense of level H indicates that the TMDS line 303 has been connected to the terminal resistor of the amplifier 200 while the RX sense of level L indicates that the TMDS line 303 has not been connected to the terminal resistor of the amplifier 200.

When the TMDS line 303 is connected to the terminal resistor of the amplifier 200, the second connection detection unit 103b detects RX sense of level H. On the other hand, when the TMDS line 303 is not connected to the terminal resistor of the amplifier 200, the second connection detection unit 103b detects RX sense of level L.

In the present exemplary embodiment, the TMDS line 303 is connected to the terminal resistor of the amplifier 200 when the amplifier 200 is in an active state. In the present exemplary embodiment, the "active state" refers to a state in which the amplifier 200 has been powered on and the video data and the audio data transmitted from the camera 100 via the TMDS line 303 has been selected as the video data and the audio data received by the amplifier 200.

Accordingly, if the second connection detection unit 103b has detected the RX sense of level H, then the CPU 101 determines that the amplifier 200 is in the active state. If the amplifier 200 is in the active state, then the amplifier 200 receives the video data and the audio data transmitted from the camera 100.

The TMDS line 303 is not connected to the terminal resistor of the amplifier 200 when the amplifier 200 is in a non-active state. In the present exemplary embodiment, the "non-active state" may arise when the amplifier 200 has been powered off or when the amplifier 200 has been powered on but the video data and the audio data transmitted from the camera 100 via the TMDS line 303 has not been selected as the video data and the audio data received by the amplifier 200.

Accordingly, if RX sense of level L is detected by the second connection detection unit 103b, then the CPU 101 determines that the amplifier 200 is in the non-active state. When the amplifier 200 is in the non-active state, the amplifier 200 does not receive the video data and the audio data transmitted from the camera 100.

The second connection detection unit 103b supplies the detected RX sense to the CPU 101 according to a request from the CPU 101. In addition, the CPU 101 determines whether the amplifier 200 can receive the video data and the audio data transmitted from the camera 100 according to the RX sense supplied from the second connection detection unit 103b. In other words, the CPU 101 determines whether the amplifier 200 is in the active state according to the RX sense supplied from the second connection detection unit 103b.

If the level of the HPD signal supplied from the first connection detection unit 103a to the CPU 101 is the level L, the capacity acquisition unit 103c cannot acquire the EDID recorded on the amplifier 200 from the amplifier 200 via the DDC line 302. If the EDID recorded on the amplifier 200 is acquired from the amplifier 200, the capacity acquisition unit 103c supplies the acquired EDID to the CPU 101.

The packet processing unit 103d can transmit the video data, the audio data, and the auxiliary data to the amplifier 200 via the TMDS line 303. If an operation mode of the camera 100 is an image capture mode, the communication unit 103 can transmit video data generated by the image capture unit 104 and audio data generated by a microphone unit (not illustrated) to the amplifier 200 via the TMDS line 303. In this case, auxiliary data generated by the CPU 101 is also transmitted to the amplifier 200 via the TMDS line 303 together with the video data and the audio data.

If the operation mode of the camera 100 is a playback mode, the communication unit 103 can transmit video data and audio data which the recording unit 105 has reproduced from a recording medium 105a to the amplifier 200 via the TMDS line 303. In this case, auxiliary data generated by the CPU 101 is also transmitted to the amplifier 200 via the TMDS line 303 together with the video data and the audio data. Furthermore, it is also useful if the packet processing unit 103d transmits video data and audio data separately from each other.

If the operation mode of the camera 100 is set to the image capture mode, the image capture unit 104 takes an image of an object. In addition, the image capture unit 104 generates video data based on an optical image of the object.

The video data generated by the image capture unit 104 can be either a moving image or a still image. The video data generated by the image capture unit 104 is supplied from the image capture unit 104 to the packet processing unit 103d, the recording unit 105, and the display unit 106. If correct EDID has been received from the amplifier 200, the CPU 101 converts the video data supplied from the image capture unit 104 to the packet processing unit 103d, into video data that conform to the display capacity included in the acquired EDID.

The video data supplied from the image capture unit 104 to the packet processing unit 103d is transmitted to the amplifier 200 via the TMDS line 303. The video data supplied from the image capture unit 104 to the recording unit 105 is recorded on the recording medium 105a. The video data supplied from the image capture unit 104 to the display unit 106 is displayed on the display unit 106.

When the image capture unit 104 generates video data, the microphone unit (not illustrated) generates audio data. The audio data generated by the microphone unit is supplied from the microphone unit to the packet processing unit 103d, the recording unit 105, and a speaker unit (not illustrated). If correct EDID has been received from the amplifier 200, the CPU 101 converts the audio data supplied from the microphone unit to the packet processing unit 103d, into audio data that complies with the audio capacity included in the acquired EDID.

The audio data supplied from the microphone unit to the packet processing unit 103d is transmitted to the amplifier 200 via the TMDS line 303. The audio data supplied from the microphone unit to the recording unit 105 is recorded on the recording medium 105a. The audio data supplied from the microphone unit to the display unit 106 is output by the speaker unit (not illustrated).

If the operation mode of the camera 100 is set to the playback mode, then the image capture unit 104 stops the shooting of the object. In addition, the image capture unit 104 stops the process for generating video data based on the optical image of the object.

If the operation mode of the camera 100 is the image capture mode, the recording unit 105 can record the video data generated by the image capture unit 104 and the audio data generated by the microphone unit on the recording medium 105a. According to a user instruction input via the operation unit 107, the CPU 101 controls the recording of the video data and the audio data generated by the image capture unit 104 and the microphone unit on the recording medium 105a.

If the operation mode of the camera 100 is the playback mode, the camera 100 can reproduce video data and audio data selected by the user from the recording medium 105a. The selection of the video data and the audio data reproduced from the recording medium 105a is controlled by the CPU 101 according to a user instruction input via the operation unit 107. The video data reproduced by the recording unit 105 from the recording medium 105a is supplied from the recording unit 105 to the packet processing unit 103d and the display unit 106.

If the EDID of the amplifier 200 has been received, then the CPU 101 converts the video data supplied from the recording unit 105 to the packet processing unit 103d, into the video data that conforms to the format of the EDID.

The video data supplied from the recording unit 105 to the packet processing unit 103d is transmitted to the amplifier 200 via the TMDS line 303. The video data supplied from the recording unit 105 to the display unit 106 is displayed on the display unit 106. The audio data which the recording unit 105 has reproduced from the recording medium 105a is supplied from the recording unit 105 to the packet processing unit 103d and the speaker unit (not illustrated).

If the EDID has been received from the amplifier 200, the CPU 101 converts the audio data supplied from the recording unit 105 to the packet processing unit 103d, into audio data compliant with the format of the EDID.

The audio data supplied from the recording unit 105 to the packet processing unit 103d is transmitted to the amplifier 200 via the TMDS line 303. The audio data supplied from the recording unit 105 to the speaker unit of the camera 100 is output by the speaker unit of the camera 100.

The recording medium 105a is a recording medium, such as a memory card or an HDD. It is useful if the recording medium 105a is a recording medium installed inside the camera 100 or a recording medium that is detachably mounted on the camera 100.

The display unit 106 includes a display unit, such as a liquid crystal display (LCD). If the operation mode of the camera 100 is to the image capture mode, the display unit 106 displays the video data generated by the image capture unit 104. On the other hand, if the operation mode of the camera 100 is the playback mode, the display unit 106 displays the video data which the recording unit 105 has reproduced from the recording medium 105a.

The operation unit 107 provides a user interface used for operating the camera 100. The operation unit 107 includes a button for operating the camera 100, such as a power button. The CPU 101 is capable of controlling the camera 100 according to a user instruction input via the operation unit 107.

The power button is a button for giving an instruction to the CPU 101 for changing the state of the camera 100 from a power-on state or to a power-off state. In the present exemplary embodiment, the "power-on state" of the camera 100 refers to a state in which the CPU 101 is controlling the power supply unit 108 to supply power to all the components of the camera 100. In addition, in the present exemplary embodiment, the "power-off state" of the camera 100 refers to a state in which the CPU 101 is controlling the power supply unit 108 to stop supplying power to all the components of the camera 100.

The power supply unit 108 supplies power to each component of the camera 100 from a battery, which is detachably installed to the camera 100, or an alternate current (AC) power source.

Now, an exemplary configuration of the amplifier 200 will be described in detail below with reference to FIG. 2. Referring to FIG. 2, the amplifier 200 includes a CPU 201, a memory 202, and a communication unit 203. In addition, the amplifier 200 includes a speaker unit (not illustrated). The CPU 201 controls the operation of the entire amplifier 200 according to a computer program stored on the memory 202.

In addition, the CPU 201 analyzes the EDID of the TV 400 acquired by the communication unit 203 from the TV 400. In addition, the CPU 201 combines the EDID of the TV 400 and the EDID of the amplifier 200 itself, which is recorded on the memory 202. Furthermore, the CPU 201 updates the information included in the EDID of the TV 400.

The information updated by the CPU 201 includes information indicating the manufacturer name included in the EDID and a physical address, audio capacity information, and display capacity information, which is information indicating the connection terminal to which the HDMI cable 300 and the HDMI cable 500 is connected.

The memory 202 includes a first EDID recording unit 202a, a second EDID recording unit 202b, and a recording medium 202c. After the EDID of the TV 400 and the EDID of the amplifier 200 are combined by the CPU 201 and the updating of the information included in the EDID of the TV 400 is completed, the resulting EDID is recorded on the first EDID recording unit 202a. In the present exemplary embodiment, the EDID recorded on the first EDID recording unit 202a will be referred to as "updated EDID".

The second EDID recording unit 202b records the EDID of the amplifier 200 itself. The recording medium 202c records the video data, the audio data, and the auxiliary data received by a second communication processing unit 203b from the camera 100 via the TMDS line 303. In addition, it is also useful if the memory 202 includes a third EDID recording unit (not illustrated) in addition to the first EDID recording unit 202a and the second EDID recording unit 202b.

The communication unit 203 includes a first communication processing unit 203a and a second communication processing unit 203b. The first communication processing unit 203a is used for communicating with the TV 400 via the HDMI cable 500 while the second communication processing unit 203b is used for communicating with the camera 100 via the HDMI cable 300.

The first communication processing unit 203a includes a connection terminal for connecting the HDMI cable 500. The number of connection terminals included in the first communication processing unit 203a can be arbitrarily determined according to the configuration of the amplifier 200. In addition, the amplifier 200 can be connected with sink apparatuses other than the TV 400, whose number can be up to the number of the connection terminals, via the HDMI cable.

The first communication processing unit 203a is capable of transmitting the +5 V power via the +5 V power line. In addition, the first communication processing unit 203a is capable of receiving the HPD signal transmitted from the TV 400 via the HPD line 501.

If the HPD signal received via the HPD line 501 has varied from the HPD signal of level H to the HPD signal of level L or if the level of the HPD signal has varied from the level L to the level H, the first communication processing unit 203a notifies the CPU 201 of the variation. In addition, if the HPD signal is requested by the CPU 201, the first communication processing unit 203a supplies the requested HPD signal to the CPU 201.

If the HPD signal received via the HPD line 501 has varied from the HPD signal of level L to the HPD signal of level H, then the first communication processing unit 203a acquires the EDID of the TV 400 from the TV 400 via the DDC line 502. If the HPD signal of level L is received, the first communication processing unit 203a cannot acquire the EDID of the TV 400 from the TV 400 via the DDC line 502.

In addition, in order to determine whether the TV 400 is present, the first communication processing unit 203a is capable of continuously determining whether the TMDS line 503 has been connected to the terminal resistor of the TV 400. Furthermore, similarly to the second connection detection unit 103b of the camera 100, by detecting the RX sense of level H or the RX sense of level L, the first communication processing unit 203a detects whether the TMDS line 503 has been connected to the terminal resistor of the TV 400.

When the TMDS line 503 is connected to the terminal resistor of the TV 400, the first communication processing unit 203a detects the RX sense of level H. On the other hand, if the TMDS line 503 is not connected to the terminal resistor of the TV 400, the first communication processing unit 203a detects the RX sense of the level L.

If the RX sense of level H has been detected by the first communication processing unit 203a, then the CPU 201 determines that the TV 400 is in the active state. On the other hand, if the RX sense of level L has been detected by the first communication processing unit 203a, then the CPU 201 determines that the TV 400 is in the non-active state.

In the present exemplary embodiment, the active state, which is detected by the first communication processing unit 203a, refers to a state in which the TV 400 is in the power on-state and the video data transmitted from the amplifier 200 via the TMDS line 503 has been selected as the video data to be displayed on the TV 400. In addition, the active state, which is detected by the first communication processing unit 203a, refers to a state in which the TV 400 is in the power-on state and the audio data transmitted from the amplifier 200 via the TMDS line 503 has been selected as the audio data to be output by the TV 400.

On the other hand, the non-active state, which is detected by the first communication processing unit 203a, refers to a state in which the TV 400 is in the power-off state or a state in which the TV 400 is in the power-on state but does not display the video data transmitted from the amplifier 200 via the TMDS line 503.

If the transmission of the RX sense is requested by the CPU 201, the first communication processing unit 203a supplies the detected RX sense to the CPU 201. The CPU 201 determines whether the TV 400 is in the active state according to the RX sense supplied from the first communication processing unit 203a.

In addition, if the level of the detected RX sense has varied from the level H to the level L, then the first communication processing unit 203a notifies the CPU 201 of the variation.

Furthermore, if the level of the detected RX sense has varied from the level L to the level H, then the first communication processing unit 203a notifies the CPU 201 of the variation.

If it is determined that the TV 400 is in the active state, then the first communication processing unit 203a transmits the video data, the audio data, and the auxiliary data recorded on the recording medium 202c to the TV 400 via the TMDS line 503. It is also useful if the first communication processing unit 203a transmits the video data and the audio data separately from each other.

On the other hand, if it is determined that the TV 400 is in the non-active state, then the first communication processing unit 203a does not transmit the video data, the audio data, and the auxiliary data recorded on the recording medium 202c to the TV 400 via the TMDS line 503.

The second communication processing unit 203b includes a connection terminal for connecting the HDMI cable 300. The number of the connection terminals included in the second communication processing unit 203b can be arbitrarily determined according to the configuration of the amplifier 200. In addition, the amplifier 200 can be connected with source apparatuses other than the camera 100, whose number can be up to the number of the connection terminals, via the HDMI cable.

The second communication processing unit 203b determines whether the camera 100 is supplying the +5 V power to the amplifier 200 via the +5 V power line. If it is determined that the camera 100 is supplying the +5 V power to the amplifier 200 via the +5 V power line, then the second communication processing unit 203b transmits the HPD signal of level H to the camera 100 via the HPD line 301. On the other hand, if it is determined that the camera 100 is not supplying the 5 V power to the amplifier 200 via the +5 V power line, then the second communication processing unit 203b transmits the HPD signal of level L to the camera 100 via the HPD line 301.

If the second communication processing unit 203b has not acquired the +5 V power from the camera 100 via the +5 V power line, then the CPU 201 executes control of the second communication processing unit 203b to transmit the HPD signal of level L to the camera 100 via the HPD line 301.

If it has been set so that the video data transmitted from the camera 100 is to be displayed on the TV 400 via the amplifier 200, then the communication unit 203 causes the camera 100 to detect information indicating the status of communication with the TV 400 in order to display the video data transmitted from the camera 100 on the TV 400. If it has been set so that the audio data transmitted from the camera 100 is to be output on the TV 400 via the amplifier 200, then the communication unit 203 causes the camera 100 to detect information indicating the status of communication with the TV 400 in order to output the audio data transmitted from the camera 100 on the TV 400.

The information indicating the status of communication with the TV 400" includes the HPD signal detected via the HPD line 501 and the RX sense detected via the TMDS line 503. Accordingly, if the second communication processing unit 203b has acquired the +5 V power from the camera 100 via the +5 V power line, then the CPU 201 causes the second communication processing unit 203b to transmit the HPD signal that is in conjunction with the HPD signal detected by the first communication processing unit 203a, to the camera 100.

In this case, if the first communication processing unit 203a has received the HPD signal of level L from the TV 400, then the second communication processing unit 203b transmits the received HPD signal of level L to the camera 100 via the HPD line 301. On the other hand, if the first communication processing unit 203a has received the HPD signal of level H from the TV 400, then the second communication processing unit 203b transmits the HPD signal of level H to the camera 100 via the HPD line 301. Furthermore, in this case, the second communication processing unit 203b transmits the EDID to the camera 100 via the DDC line 302.

If the second communication processing unit 203b has transmitted the EDID to the camera 100 and if the updated EDID has been recorded on the first EDID recording unit 202a, then the second communication processing unit 203b transmits the updated EDID to the camera 100. On the other hand, if the updated EDID has not been recorded on the first EDID recording unit 202a, then the second communication processing unit 203b transmits the EDID of the amplifier 200, which is recorded on the second EDID recording unit 202b, to the camera 100. If the HPD signal of level L has been transmitted to the camera 100 via the HPD line 301, then the second communication processing unit 203b does not transmit the EDID.

The CPU 201 controls the second communication processing unit 203b so that the second communication processing unit 203b transmits the RX sense that is in conjunction with the RX sense supplied from the first communication processing unit 203a to the camera 100.

If the first communication processing unit 203a has detected the RX sense of the level L from the TV 400, then the second communication processing unit 203b outputs the RX sense of the level L to the camera 100. On the other hand, if the first communication processing unit 203a has detected the RX sense of level H from the TV 400, then the second communication processing unit 203b outputs the RX sense of level H to the camera 100.

Similarly, if it has been set so that the audio data transmitted from the camera 100 is to be output from the speaker unit of the TV 400 via the amplifier 200, then the communication unit 203 causes the camera 100 to detect the information indicating the status of communication with the TV 400, which is detected by the first communication processing unit 203a.

Similarly, if a TV 600 (not illustrated), which is different from the TV 400, has been connected to the amplifier 200 by using an HDMI cable and if it has been set so that the video data transmitted from the camera 100 is to be displayed on the TV 600 (not illustrated) via the amplifier 200, then the communication unit 203 causes the camera 100 to detect the HPD signal and the RX sense that indicate the status of communication with the TV 600 (not illustrated), which is detected by the first communication processing unit 203a.

On the other hand, if it has been set such that the video data transmitted from the camera 100 is to be displayed on the TV 600 (not illustrated) via the amplifier 200, then the communication unit 203 causes the camera 100 to detect the HPD signal and the RX sense that indicate the status of communication with the TV 600 instead of causing the camera 100 to detect the HPD signal and the RX sense indicating the status of communication with the TV 400.

On the other hand, if it has been set such that the video data transmitted from the camera 100 is to be displayed on the TV 400 via the amplifier 200, then the communication unit 203 causes the camera 100 to detect the HPD signal and the RX sense that indicate the status of communication with the TV 400 instead of causing the camera 100 to detect the HPD signal and the RX sense indicating the status of communication with the TV 600.

The second communication processing unit 203b is capable of receiving the video data, the audio data, and the auxiliary data transmitted from the camera 100 via the TMDS line 303. The CPU 201 executes control of the second communication processing unit 203b to record the received video data, audio data, and auxiliary data on the recording medium 202c.

If it has been set such that the audio data transmitted from the camera 100 is to be output from a speaker (not illustrated) of the amplifier 200, then the audio data recorded on the recording medium 202c is supplied from the recording medium 202c to the speaker unit (not illustrated) to be output from the speaker unit of the amplifier 200. In this case, the audio data recorded on the recording medium 202c is not output from the speaker unit of the TV 400.

Now, an exemplary configuration of the TV 400 will be described in detail below with reference to FIG. 2. Referring to FIG. 2, the TV 400 includes a CPU 401, a tuner unit 402, a communication unit 403, a display unit 404, an operation unit 405, a memory 406, and a power supply unit 407. In addition, the TV 400 includes the speaker unit (not illustrated), which outputs audio data.

The CPU 401 controls the operation of the entire TV 400 according to a computer program stored on the memory 406. In addition, the CPU 401 executes control of the power supply unit 407 to supply power to or suspend power supply to each unit.

The tuner unit 402 receives television broadcast data of the television channel selected by the user. The communication unit 403 includes a connection terminal for connecting the HDMI cable 500. The communication unit 403 is capable of receiving, via the TMDS line 503, the video data, the audio data, and the auxiliary data received from the camera 100 via the amplifier 200.

The video data received from the camera 100 via the amplifier 200 is displayed on the display unit 404. The audio data received from the camera 100 via the amplifier 200 is output from the speaker unit (not illustrated). The auxiliary data received from the camera 100 via the amplifier 200 is supplied to the CPU 401. The CPU 401 is capable of controlling the TV 400 according to the auxiliary data received from the camera 100 via the amplifier 200.

The number of the connection terminals included in the communication unit 403 can be arbitrarily determined according to the configuration of the TV 400. In addition, the TV 400 can communicate with source apparatuses other than the camera 100 or with repeater apparatuses other than the amplifier 200, whose number can be up to the number of the connection terminals, via the HDMI cable.

Accordingly, the TV 400 is capable of receiving the video data, the audio data, and the auxiliary data transmitted by the source apparatus other than the camera 100. In this case, similarly to the case of using the camera 100, the video data received from the source apparatus other than the camera 100 is displayed on the display unit 404 and the audio data received from the source apparatus other than the camera 100 is output from the speaker unit (not illustrated). In addition, the audio data is supplied to the CPU 401.

The communication unit 403 determines whether the amplifier 200 is supplying the +5 V power to the TV 400 via the +5 V power line. If it is determined that the amplifier 200 is supplying the +5 V power to the TV 400 via the +5 V power line, then the communication unit 403 transmits the HPD signal of level H to the amplifier 200 via the HPD line 501. On the other hand, if the amplifier 200 is not supplying the +5 V power to the TV 400 via the +5 V power line, then the communication unit 403 transmits the HPD signal of level L to the amplifier 200 via the HPD line 501.

If the communication unit 403 has not acquired the +5 V power from the amplifier 200 via the +5 V power line, then the CPU 401 executes control of the communication unit 403 to transmit the HPD signal of level L to the amplifier 200 via the HPD line 501. On the other hand, if the communication unit 403 has acquired the +5 V power from the amplifier 200 via the +5 V power line, then the CPU 401 determines whether the EDID of the TV 400, which is stored on the memory 406, can be transmitted to the amplifier 200 via the DDC line 502.

If the information included in the EDID recorded on the memory 406 has not been changed or if the updating of the EDID, which is executed when the setting of the TV 400 has been changed, is completed, then the CPU 401 determines that the EDID of the TV 400 can be transmitted to the amplifier 200 via the DDC line 502. In this case, the communication unit 403 transmits the HPD signal of level H to the amplifier 200 via the HPD line 501.

If the information included in the EDID has been updated, then the CPU 401 determines that the EDID of the TV 400 cannot be transmitted to the amplifier 200 via the DDC line 502. In this case, the communication unit 403 transmits the HPD signal of level L to the amplifier 200 via the HPD line 501. In addition, the communication unit 403 is capable of transmitting the EDID of the TV 400 to the amplifier 200 via the DDC line 502.

The display unit 404 includes a display unit, such as the LCD. The display unit 404 is capable of displaying the video data supplied from at least one of the tuner unit 402 and the communication unit 403.

When the video data received from the amplifier 200 is supplied by the communication unit 403 to the display unit 404 via the TMDS line 503, the display unit 404 displays the video data received from the amplifier 200. When the audio data received from the amplifier 200 is supplied by the communication unit 403 to the speaker unit (not illustrated) via the TMDS line 503, the speaker unit (not illustrated) outputs the audio data received from the amplifier 200.

The operation unit 405 provides a user interface used in operating the TV 400. The operation unit 405 includes a plurality of buttons, which are used in operating the TV 400. The CPU 401 is capable of controlling the TV 400 according to a user instruction input via the operation unit 405.

The power button can be operated to give an instruction to the CPU 401 for changing the state of the TV 400 between the power-on state and the power-off state. In the present exemplary embodiment, the "power-on state" of the TV 400 refers to a state in which the CPU 401 is controlling the power supply unit 407 to supply power to all the components of the TV 400. In addition, in the present exemplary embodiment, the "power-off state" refers to a state in which the CPU 401 is controlling the power supply unit 407 to stop supplying power to all the components of the TV 400. The power supply unit 407 supplies power to all the components of the TV 400 from an AC power supply unit.

Figure 3:
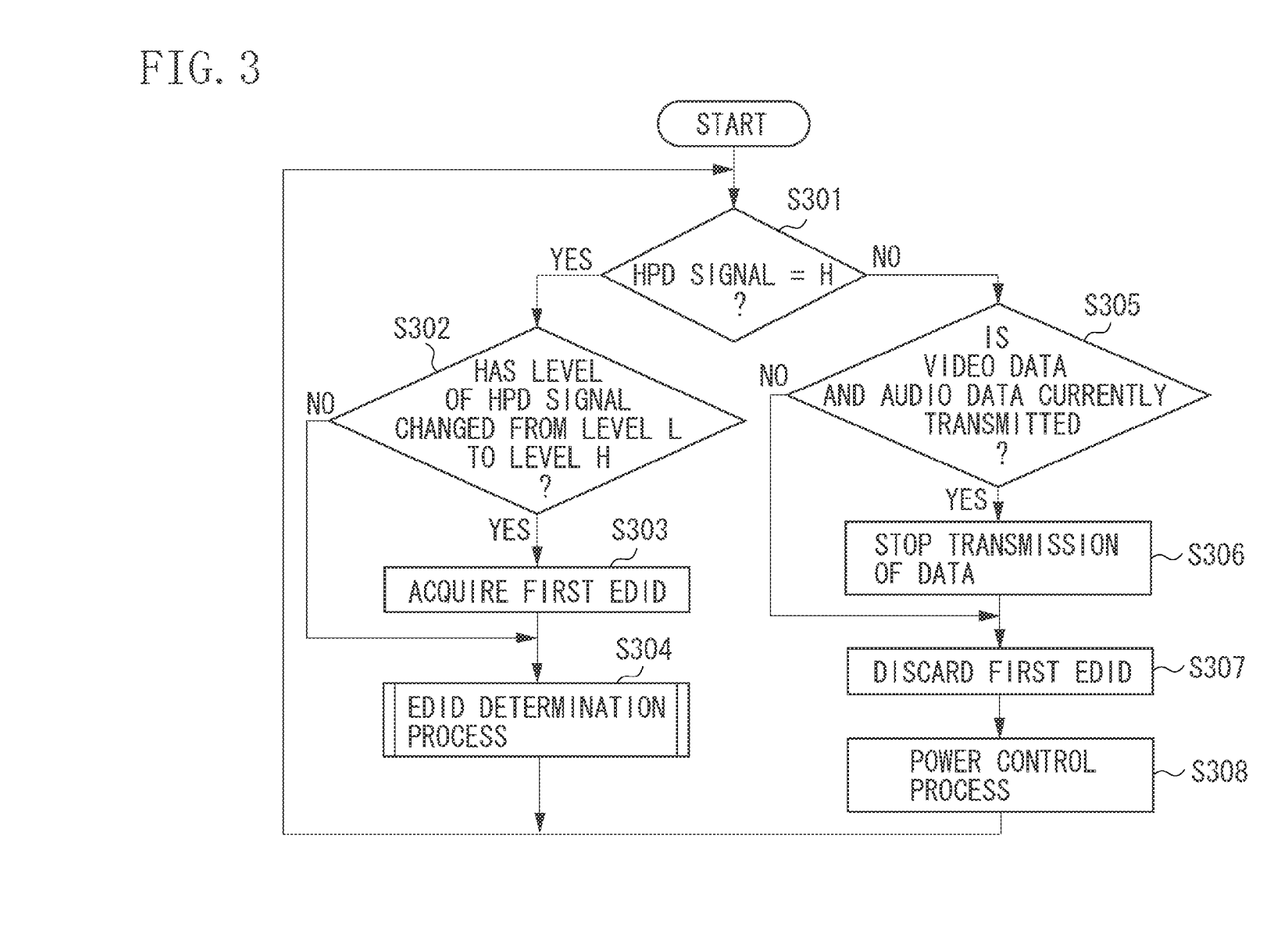
FIG. 3 is a flow chart illustrating an example of process for acquiring an EDID, which is executed by a communication apparatus according to the first exemplary embodiment of the present invention.

Now, process for acquiring EDID, which is executed by the camera 100 according to the present exemplary embodiment will be described in detail below with reference to FIG. 3. FIG. 3 is a flow chart illustrating an example of processing for acquiring an EDID, which is executed by the communication apparatus 100 according to the present exemplary embodiment.

The camera 100 executes the EDID acquisition processing if the amplifier 200 and the TV 400 are mutually and physically connected via the HDMI cable 500 and the camera 100 and the amplifier 200 are mutually and physically connected via the HDMI cable 300.

In the present exemplary embodiment, it is premised that the camera 100, the amplifier 200, and the TV 400 have already been in the power-on state. In addition, it is also premised that the camera 100 supplies +5 V power to the amplifier 200 via the HDMI cable 300. Furthermore, it is also premised in the present exemplary embodiment that the amplifier 200 supplies the +5 V power to the TV 400 via the HDMI cable 500.

Moreover, in the present exemplary embodiment, it has been set such that when the EDID acquisition process starts, the video data to be transmitted from the camera 100 to the amplifier 200 is transmitted from the amplifier 200 to the TV 400 and the transmitted video data is to be displayed on the TV 400.

The CPU 101 executes a computer program stored in the memory 102, to control the EDID acquisition process. It is also useful if the computer program for causing the camera 100 to execute the EDID acquisition process illustrated in the flow chart of FIG. 3 is implemented by utilizing an operating system (OS) operating on a computer (a CPU or a micro processing unit (MPU)) or by utilizing a network.

Referring to FIG. 3, in step S301, the CPU 101 determines whether the level of the HPD signal detected by the first connection detection unit 103a is the level H. If it is determined that the level of the HPD signal detected by the first connection detection unit 103a is the level H (YES in step S301), then the process advances from step S301 to step S302. On the other hand, if it is determined that the level of the HPD signal detected by the first connection detection unit 103a is the level L (NO in step S301), then the process advances from step S301 to step S305.

If it is determined that the level of the HPD signal is the level H (YES in step S301), then the CPU 101 is to determine whether EDID can be acquired from the amplifier 200 according to the variation of the HPD signal. In step S302, the CPU 101 determines whether the level of the HPD signal, which is detected by the first connection detection unit 103a, has varied from the level L to the level H.

If it is determined that the level of the HPD signal has varied from the level L to the level H (YES in step S302), then the process advances from step S302 to step S303. On the other hand, if it is determined that the level of the HPD signal has not varied from the level L to the level H (NO in step S302), then the process advances from step S302 to step S304. In this case, the CPU 101 determines that the same EDID as the EDID recorded on the memory 202 of the amplifier 200 has already been acquired from the amplifier 200.

If it is determined that the level of the HPD signal has varied from the level L to the level H (YES in step S302), then the CPU 101 determines that the updating of the EDID by the amplifier 200 has been completed and now the EDID recorded on the memory 202 can be acquired from the amplifier 200.

Accordingly, in this case, the camera 100 is to acquire the EDID recorded on the first EDID recording unit 202a of the memory 202 from the amplifier 200 via the DDC line 302 to transmit the video data to the TV 400 via the amplifier 200. In step S303, the capacity acquisition unit 103c acquires the EDID from the amplifier 200 via the DDC line 302. Furthermore, the capacity acquisition unit 103c supplies the acquired EDID to the CPU 101.

After receiving the EDID, the CPU 101 executes analysis on the EDID supplied from the capacity acquisition unit 103c. In addition, the CPU 101 records a result of the analysis and the received EDID on the memory 102. After recording the result of the analysis on the EDID and the EDID on the memory 102, the process advances from step S303 to step S304.

In the present exemplary embodiment, when the HPD signal has varied from the level L to the level H, the EDID that the capacity acquisition unit 103c acquires from the amplifier 200 via the DDC line 302 is referred to as first EDID (first information).

In step S304, the CPU 101 executes EDID determination process. The EDID determination process will be described in detail below. After the CPU 101 has executed the EDID determination process, the process returns from step S304 to step S301.

On the other hand, if it is determined that the level of the HPD signal is the level L (NO in step S301), then the CPU 101 determines that EDID cannot be acquired from the amplifier 200 via the DDC line 302. Accordingly, if the video data and the audio data is being transmitted to the TV 400 via the amplifier 200, then the camera 100 is to stop the transmission.

In step S305, the CPU 101 determines whether the packet processing unit 103d is currently transmitting the video data and the audio data to the amplifier 200 via the TMDS line 303. If it is determined that the packet processing unit 103d is currently transmitting the video data and the audio data to the amplifier 200 via the TMDS line 303 (YES in step S305), then the process advances from step S305 to step S306. On the other hand, if it is determined that the packet processing unit 103d is not currently transmitting the video data and the audio data to the amplifier 200 via the TMDS line 303 (NO in step S305), then the process advances from step S305 to step S307.

If it is determined that the packet processing unit 103d is currently transmitting the video data and the audio data to the amplifier 200 via the TMDS line 303 (YES in step S305), then in step S306, the CPU 101 stops the transmission of the video data and the audio data by the packet processing unit 103d. After the control by the CPU 101 of the packet processing unit 103d for stopping the transmission of the video data and the audio data is executed, the process advances from step S306 to step S307.

On the other hand, if it is determined that the packet processing unit 103d is not currently transmitting the video data and the audio data to the amplifier 200 via the TMDS line 303 (NO in step S305), the packet processing unit 103d does not output the video data to the amplifier 200 until an HPD signal of level H is detected. In step S306, if the packet processing unit 103d has stopped the transmission of the video data and the audio data, the packet processing unit 103d does not transmit the video data to the TV 400 via the amplifier 200 until an HPD signal of level H is detected again.

In step S307, the CPU 101 discards the first EDID, which has been recorded on the memory 102, from the memory 102. After the discard of the first EDID is completely executed by the CPU 101, the process advances from step S307 to step S308. If no EDID has been stored on the memory 102, the process in step S307 may be omitted.

After the first EDID is discarded by the CPU 101 in step S307, the transmission of the video data and the audio data by the packet processing unit 103d has already been stopped. Accordingly, even if the power to transmit the video data and the audio data to the amplifier 200 via the TMDS line 303 has been supplied from the power supply unit 108 to the packet processing unit 103d, the packet processing unit 103d may consume power more than the supplied power.

In step S308, the CPU 101 executes power control process. In the present exemplary embodiment, the "power control process" refers to process executed by the CPU 101 for controlling the power supply unit 108 to stop the supply of power to the packet processing unit 103d of the communication unit 103. After controlling the power supply unit 108 to stop the supply of power to the packet processing unit 103d, the process returns from step S308 to step S301.

It is also useful if the CPU 101 executes the following control. More specifically, in this case, if the power supply unit 108 has stopped the supply of power to the packet processing unit 103d and if the first connection detection unit 103a has detected an HPD signal of level H, the CPU 101 may control the power supply unit 108 so that the power supply unit 108 resumes the supply of power to the packet processing unit 103d.

Furthermore, it is also useful if the CPU 101 controls the power supply unit 108 so that the power supply unit 108 stops the supply of power to the capacity acquisition unit 103c in addition to stopping the supply of power to the packet processing unit 103d. In this case, it is also useful if the CPU 101 executes the following control. More specifically, in this case, the CPU 101 controls the power supply unit 108 so that the power supply unit 108 resumes the supply of power to the capacity acquisition unit 103c and the packet processing unit 103d if an HPD signal of level H has been detected by the first connection detection unit 103a.

The CPU 101 controls the power supply unit 108 so that the power supply unit 108 does not stop the supply of power to the first connection detection unit 103a and the second connection detection unit 103b in order to detect the status of communication among the camera 100, the amplifier 200, and the TV 400. Furthermore, the CPU 101 controls the power supply unit 108 so that the power supply unit 108 does not stop the supply of the +5 V power from the camera 100 to the amplifier 200 via the +5 V power line.

Figure 4:
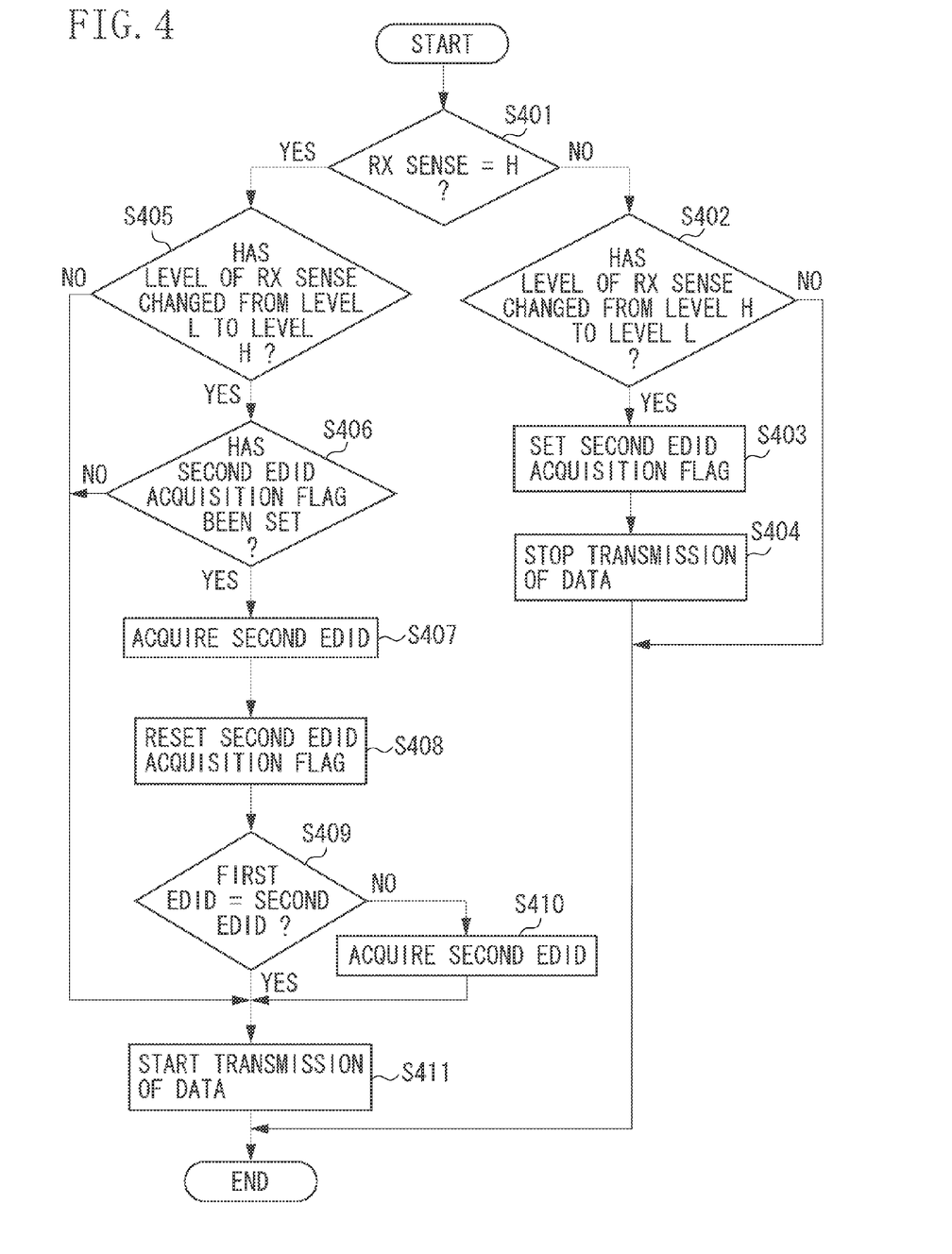
FIG. 4 is a flow chart illustrating an example of process for determining an EDID, which is executed by the communication apparatus according to the first exemplary embodiment of the present invention.

Now, exemplary EDID determination process by the camera 100 according to the present exemplary embodiment will be described in detail below with reference to FIG. 4. FIG. 4 is a flow chart illustrating exemplary EDID determination process, which is executed by the communication apparatus 100 in step S304 in the flow chart of FIG. 3 according to the present exemplary embodiment.

The CPU 101 executes a computer program stored in the memory 102, to control the EDID determination process. It is also useful if the computer program for causing the camera 100 to execute the EDID determination process illustrated in the flow chart of FIG. 4 is implemented by utilizing an OS operating on a computer or by utilizing a network.

After the first EDID is acquired by the capacity acquisition unit 103c from the amplifier 200 in step S303 (FIG. 3), the process illustrated in the flow chart of FIG. 4 starts. Referring to FIG. 4, in step S401, the CPU 101 determines whether the level of the RX sense, which is detected by the second connection detection unit 103b, is the level H. If it is determined that the level of the RX sense, which is detected by the second connection detection unit 103b, is the level H (YES in step S401), then the process advances from step S401 to step S405. On the other hand, if it is determined that the level of the RX sense, which is detected by the second connection detection unit 103b, is the level L (NO in step S401), then the process advances from step S401 to step S402.

If it is determined that the level of the RX sense, which is detected by the second connection detection unit 103b, is the level L (NO in step S401), then the CPU 101 determines that the amplifier 200 is in the non-active state. If it is determined that the amplifier 200 is in the non-active state, then it is likely that the amplifier 200 cannot receive the video data transmitted from the camera 100.

Accordingly, if the amplifier 200 is in the non-active state and if the packet processing unit 103d is currently transmitting the video data, then the transmission to reduce the power consumed by the packet processing unit 103d is to be stopped.

In step S402, the CPU 101 determines whether the level of the RX sense, which is detected by the second connection detection unit 103b, has varied from the level H to the level L. The CPU 101 determines whether the state of the amplifier 200 has been changed from the active state to the non-active state according to a result of the determination as to whether the level of the RX sense has varied from the level H to the level L.

If it is determined that the level of the RX sense, which is detected by the second connection detection unit 103b, has varied from the level H to the level L (YES in step S402), then the process advances from step S402 to step S403. On the other hand, if it is determined that the level of the RX sense, which is detected by the second connection detection unit 103b, has not varied from the level H to the level L (NO in step S402), then the CPU 101 determines that the amplifier 200 remains to be in the non-active state.

In this case, the CPU 101 determines that the transmission of the video data by the packet processing unit 103d has already been stopped and that the transmission of the video data is not currently executed. Accordingly, the EDID determination process according to the flowchart of FIG. 4 ends. Then, the process returns from step S402 to step S301 illustrated in FIG. 3.

On the other hand, if it is determined that the level of the RX sense, which is detected by the second connection detection unit 103b, has varied from the level H to the level L (YES in step S402), then the CPU 101 determines that the state of the amplifier 200 has been changed from the active state to the non-active state.

If the state of the amplifier 200 has been changed from the active state to the non-active state, then the state of the TV 400 may also be changed from the active state to the non-active state. If it is determined that the state of the TV 400 has been changed from the active state to the non-active state, then the amplifier 200 may determines that the TV 400 now cannot display the video data transmitted from the camera 100. In this case, the amplifier 200 may discard the updated EDID from the first EDID recording unit 202a.

After that, the amplifier 200 notifies the camera 100 that the state of the amplifier 200 has been changed from the active state to the non-active state and the state of the TV 400 has been changed from the active state to the non-active state and that therefore the TV 400 now cannot display the video data transmitted from the camera 100.

In this case, the amplifier 200 cannot acquire the EDID of the TV 400 until it is detected that the level of the HPD signal transmitted from the TV 400 has varied from the level L to the level H even if the state of the TV 400 has been changed to the active state again.

If the first EDID that the camera 100 has acquired is updated EDID and if the state of the amplifier 200 is changed from the active state to the non-active state, the updated EDID, which has been recorded on the first EDID recording unit 202a of the amplifier 200, is discarded from the first EDID recording unit 202a. In this case, the first EDID that the camera 100 has acquired from the amplifier 200 may not match the EDID of the amplifier 200, which is currently stored on the memory 202 of the amplifier 200.

Moreover, in this case, if the camera 100 transmits the video data to the amplifier 200, whose state has now been changed from the non-active state to the active state, according to the first EDID, then the video data that is not conformed to the display capacity included in the EDID of the amplifier 200 may be transmitted.

To prevent this, after the state of the amplifier 200 has been changed from the active state to the non-active state, if it is detected that the state of the amplifier 200 is changed from the non-active state to the active state due to the change of the state of the TV 400 from the non-active state to the active state again, then the CPU 101 is to acquire the EDID of the amplifier 200 from the amplifier 200 again.

In step S403, the CPU 101 sets an EDID acquisition flag to the memory 102. In the present exemplary embodiment, the "EDID acquisition flag" refers to a flag that indicates process for acquiring the EDID of the amplifier 200 from the amplifier 200 is to be executed again.

If it is determined that the EDID acquisition flag has been set to the memory 102, then the CPU 101 determines that the state of the amplifier 200 has been changed from the active state to the non-active state and executes control of the capacity acquisition unit 103c to acquire the EDID from the amplifier 200 again. After setting the EDID acquisition flag to the memory 102, the process advances from step S403 to step S404.

If the amplifier 200 is in the non-active state, the amplifier 200 cannot receive the video data transmitted from the camera 100. Accordingly, in step S404, the CPU 101 executes control of the packet processing unit 103d to stop the transmission of the video data and the audio data to the amplifier 200. After executing control of the packet processing unit 103d to stop the transmission of the video data and the audio data, the process returns from step S404 to step S301 illustrated in FIG. 3.

If it is determined that the level of the RX sense is the level H (YES in step S401), the CPU 101 determines that the amplifier 200 is in the active state. After having changed the state of the amplifier 200 from the active state to the non-active state if it is determined that the state of the amplifier 200 has been changed from the non-active state to the active state after that again, the CPU 101 is to acquire the EDID from the amplifier 200. Accordingly, the CPU 101 is to determine whether the state of the amplifier 200 has been changed from the non-active state to the active state.

In step S405, the CPU 101 determines whether the level of the RX sense, which is detected by the second connection detection unit 103b, has varied from the level L to the level H. If it is determined that the level of the RX sense, which is detected by the second connection detection unit 103b, has varied from the level L to the level H (YES in step S405), then the process advances from step S405 to step S406. On the other hand, if it is determined that the level of the RX sense, which is detected by the second connection detection unit 103b, has not varied from the level L to the level H (NO in step S405), then the process advances from step S405 to step S411.

If it is determined that the level of the RX sense, which is detected by the second connection detection unit 103b, has varied from the level L to the level H (YES in step S405), then the CPU 101 determines that the state of the amplifier 200 has been changed from the non-active state to the active state.

If the amplifier 200 is in the active state, the amplifier 200 can receive the video data transmitted from the camera 100. Accordingly, the camera 100 can start the transmission of the video data to the amplifier 200. In this case, whether or not the packet processing unit 103d to acquire the EDID from the amplifier 200 again before transmitting the video data according to the first EDID to the amplifier 200 is to be determined.

In step S406, the CPU 101 determines whether the EDID acquisition flag has been set to the memory 102 in order to determine whether the state of the amplifier 200 has been changed from the active state to the non-active state. If it is determined that the EDID acquisition flag has been set to the memory 102 (YES in step S406), then the process advances from step S406 to step S407. On the other hand, if it is determined that the EDID acquisition flag has not been set to the memory 102 (NO in step S406), then the process advances from step S406 to step S411.

If the EDID acquisition flag has been set to the memory 102 (YES in step S406), then the process advances to step S407. In step S407, the CPU 101 executes control of the capacity acquisition unit 103c to acquire the EDID from the amplifier 200 via the DDC line 302. After the capacity acquisition unit 103c has acquired the EDID from the amplifier 200 and supplied the acquired EDID to the CPU 101, the process advances from step S407 to step S408.

In the present exemplary embodiment, the EDID that the capacity acquisition unit 103c acquires from the amplifier 200 via the DDC line 302 in step S407 is referred to as second EDID (second information). More specifically, the second EDID is EDID that the camera 100 acquires from the amplifier 200 if the state of the amplifier 200 is changed from the non-active state to the active state after it is once changed from the active state to the non-active state.

In step S408, the CPU 101 resets the EDID acquisition flag set on the memory 102. After resetting the EDID acquisition flag set to the memory 102, the process advances from step S408 to step S409.

In step S409, the CPU 101 compares the first EDID, which has been recorded on the memory 102 in step S303, with the second EDID, which has been supplied to the CPU 101 in step S407. In addition, the CPU 101 analyzes the second EDID supplied from the capacity acquisition unit 103c and compares a result of the analysis on second EDID and the result of the analysis on the first EDID, which has been recorded on the memory 102. Furthermore, the CPU 101 determines whether the information included in the first EDID matches the information included in the second EDID.

If it is determined that the information included in the first EDID matches the information included in the second EDID (YES in step S409), then the process advances from step S409 to step S411. At this timing, the CPU 101 discards the second EDID and the result of the analysis on the second EDID.

On the other hand, if it is determined that the information included in the first EDID does not match the information included in the second EDID (NO in step S409), then the process advances from step S409 to step S410. More specifically, if the information included in the first EDID does not match the information included in the second EDID (NO in step S409), it is likely that the second EDID is the EDID of the amplifier 200.

Accordingly, in this case, the CPU 101 is to generate the video data and the audio data is to be transmitted to the amplifier 200 according to the information included in the second EDID. In step S410, the CPU 101 discards the first EDID and the result of the analysis on the first EDID from the memory 102. In addition, the CPU 101 records the second EDID and the result of the analysis on the second EDID on the memory 102. After recording the second EDID and the result of the analysis on the memory 102, the process advances from step S410 to step S411.

On the other hand, if the level of the RX sense, which is detected by the second connection detection unit 103b, has not changed from the level L to the level H (NO in step S405), the amplifier 200 remains to be in the active state. In this case, the packet process unit 103d can transmit the video data generated according to the first EDID and the result of the analysis on the EDID to the amplifier 200.

Furthermore, if the EDID acquisition flag has not been set to the memory 102 (NO in step S406), the packet processing unit 103d can transmit the video data generated according to the first EDID and the result of the analysis on the EDID to the amplifier 200 without acquiring the second EDID.

If the information included in the first EDID matches the information included in the second EDID (YES in step S409), then the packet processing unit 103d can transmit the video data generated according to the first EDID and the result of the analysis on the first EDID to the amplifier 200.

If the second EDID and the result of the analysis on the second EDID are recorded on the memory 102 in step S410, the packet processing unit 103d can transmit the video data generated according to the second EDID and the result of the analysis on the second EDID. In step S411, the CPU 101 executes image output process so that the packet processing unit 103d executes the transmission of the video data. The image output process includes process for changing the data format and process for transmitting the data.

The process for changing the data format refers to process for changing the format of the video data and the audio data to be supplied to the packet processing unit 103d, to the format of the video data and the audio data, which is included in the EDID recorded on the memory 102.

If the result of the analysis of the first EDID is recorded on the memory 102, the CPU 101 changes the format of the video data to a video format included in the first EDID, changes the format of the audio data to an audio format included in the first EDID, and supplies the video data and the audio data whose format has been changed, to the packet processing unit 103d.

If the result of the analysis on the second EDID is recorded on the memory 102, the CPU 101 changes the format of the video data to a video format included in the second EDID, changes the format of the audio data to an audio format included in the second EDID, and supplies the video data and the audio data whose format has been changed to the packet processing unit 103d.

If the format changing process has been already been executed, it is also useful if the format changing process is not executed at this timing. The process for transmitting the data refers to process for transmitting the video data and the audio data whose format has been changed to the format defined in the EDID, to the TV 400 via the amplifier 200 and the TMDS line 303.

After the CPU 101 has executed the image output process, the process according to the flowchart of FIG. 4 ends. Then, the process returns from step S411 to step S301 illustrated in FIG. 3.

As described above, the camera 100 according to the present exemplary embodiment determines the state of the amplifier 200 based on the RX sense. Furthermore, in the present exemplary embodiment, the camera 100 acquires the EDID from the amplifier 200 again according to the result of the determination. In addition, the CPU 101 mutually compares the already acquired EDID and the EDID acquired again.

With the above-described configuration, the camera 100 according to the present exemplary embodiment can acquire appropriate EDID from the amplifier 200 even when the amplifier 200, which is connected to the camera 100 via the HDMI cable 300, has overwritten the EDID or discard the overwritten and updated EDID.

Accordingly, the present exemplary embodiment having the configuration described above can prevent generation of video data and audio data having a format not in compliance with the configuration of the amplifier 200 or transmission of video data and audio data generated according to a format not in compliance with the configuration of the amplifier 200.

Accordingly, the camera 100 according to the present exemplary embodiment can acquire appropriate EDID from the amplifier 200 and transmit video data and audio data that is in compliance with the configuration of the amplifier 200 according to the acquired EDID.

It is also useful if the EDID acquisition process and the EDID determination process are executed when the state of the TV has been changed from a state in which the TV 400 displays the video data supplied from the amplifier 200, which is received from the camera 100, to a state in which the TV 600 (not illustrated) displays the video data supplied from the amplifier 200, which is received from the camera 100.

The state of the TV is changed from a state in which the TV 400 displays the video data supplied from the amplifier 200, which is received from the camera 100, to a state in which the TV 600 (not illustrated) displays the video data supplied from the amplifier 200, which is received from the camera 100 when the user uses a remote controller (not illustrated) of the TV 600 (not illustrated) to change the TV that displays the video data reproduced from the camera 100 from the TV 400 to the TV 600.

In this case, the state of the amplifier 200 is changed from a state in which the video data supplied from the camera 100 is transmitted to the TV 400, to a state in which the video data supplied from the camera 100 is transmitted from the TV 400 to the TV 600 (not illustrated) according to the RX sense detected by the first communication processing unit 203a.

If the state changes from the state in which the amplifier 200 transmits the video data supplied from the camera 100 to the TV 400, to a state in which the amplifier 200 transmits the video data supplied from the camera 100 to the TV 600 (not illustrated), then the level of the RX sense detected by the second connection detection unit 103b varies from the level H to the level L and then varies from the level L to the level H again.

Accordingly, after the state of the amplifier 200 has been changed from the active state to the non-active state, if it is determined that the state of the amplifier 200 has been changed from the non-active state to the active state again, then the amplifier 200 is to acquire the display capacity and the audio output capacity of the TV 600, which has been acquired by the amplifier 200 from the TV 600, again from the amplifier 200 in order to transmit the video data suitable for the TV 600, to the TV 600 via the amplifier 200.

As described above, if the destination of transmitting the video data supplied from the camera 100 has been changed from the TV 400 to the TV 600 (not illustrated) during a time period in which the amplifier 200 is currently transmitting the video data supplied from the camera 100 to the TV 400, the CPU 101 according to the present exemplary embodiment executes the process from step S407 through S411. Accordingly, the CPU 101 according to the present exemplary embodiment can transmit the video data having the format suitable for the TV 600, to the TV 600 via the amplifier 200.

In this case, it is likely that the EDID generated by combining the EDID of the amplifier 200 itself with the EDID of the TV 600 becomes the second EDID (the second information).

Other Embodiments

The communication apparatus according to the exemplary embodiment of the present invention is not limited to the communication apparatus 100 described above in the first exemplary embodiment. More specifically, it is also useful if the communication apparatus is implemented by a system including a plurality of devices.

In addition, it is also useful if the present invention is implemented by executing the process for implementing the function of the above-described first exemplary embodiment of the present invention by using a computer program. In this case, the computer program recorded on a computer-readable recording medium is executed by a computer. It is also useful if the above-described computer program is supplied to an apparatus or a system and is executed by the apparatus or the computer of the system.

The computer-readable recording medium can include an HDD, an optical disk, a compact disc-read only memory (CD-ROM), a CD-recordable (CD-R), a memory card, or a ROM. In addition, it is also useful if the computer program is provided from an external apparatus to the computer via a communication interface and is executed by the computer.

While the present invention has been described with reference to exemplary embodiments, it is to be understood that the present invention is not limited to the disclosed exemplary embodiments. The scope of the following claims is to be accorded the broadest interpretation so as to encompass all modifications, and equivalent structures and functions.

This application claims priority from Japanese Patent Application No. 2009-189336 filed Aug. 18, 2009, which is hereby incorporated by reference herein in its entirety.

What is claimed is:

1. A communication apparatus comprising:
a transmitting unit that transmits video data to an external apparatus, connected to a repeater apparatus, via the repeater apparatus; and
an acquisition unit that performs a process for acquires first information from the repeater apparatus, wherein the acquisition unit performs a process for acquiring the first information from the repeater apparatus after a Hot Plug Detect (HPD) signal is changed to a high level from a low level, wherein the first information includes information for generating video data,
wherein the acquisition unit performs a process for acquiring second information from the repeater apparatus if a predetermined state of an external apparatus, connected to the repeater apparatus, is changed to a first state from a second state after the first information is acquired from the repeater apparatus,
wherein the second information includes information for generating video data,
wherein the first state is a state that an external apparatus, connected to the repeater apparatus, displays video data to be transmitted from the repeater apparatus, and
wherein the second state is a state that an external apparatus connected to the repeater apparatus, does not display video data to be transmitted from the repeater apparatus.

2. The communication apparatus according to claim 1, wherein the first information includes one of extended display identification data (EDID) and enhanced EDID (E-EDID), and
wherein the second information includes one of EDID and E-EDID.

3. The communication apparatus according to claim 1, wherein the transmitting unit transmits video data generated based on the first information if the first information corresponds to the second information.

4. The communication apparatus according to claim 1, wherein the transmitting unit transmits video data generated based on the second information without transmitting video data generated based on the first information if the first information does not correspond to the second information.

5. The communication apparatus according to claim 1, wherein the transmitting unit conforms to Transition Minimized Differential Signaling (TMDS).

6. A method of controlling a communication apparatus the method comprising:
performing a process for acquiring first information from the a repeater apparatus, wherein the acquisition unit performs a process for acquiring the first information from the repeater apparatus after a Hot Plug Detect (HPD) signal is changed to a high level from a low level, wherein the first information includes information for generating video data; and
performing a process for acquiring second information from the repeater apparatus if a predetermined state of an external apparatus, connected to repeater apparatus, is changed to a first state from a second state after the first information is acquired from the repeater apparatus,
wherein the second information includes information for generating video data,
the first state is a state that an external apparatus connected to the repeater apparatus, displays video data to be transmitted from the repeater apparatus, and
the second state is a state that an external apparatus connected to the repeater apparatus, does not display video data to be transmitted from the repeater apparatus, and
transmitting video data to an external apparatus, connected to the repeater apparatus, via the repeater apparatus.

7. The method according to claim 6, wherein the first information includes one of extended display identification data (EDID) and enhanced EDID (E-EDID), and
wherein the second information includes one of EDID and E-EDID.

8. The method according to claim 6, further comprising:
performing a process for transmitting video data generated based on the first information if the first information corresponds to the second information.

9. The method according to claim 6, further comprising:
performing a process for transmitting video data generated based on the second information without transmitting video data generated based on the first information if the first information does not correspond to the second information.

10. The method according to claim 6, wherein the communication apparatus conforms to Transition Minimized Differential Signaling (TMDS).

11. A non-transitory recording medium storing a program, wherein the program causes a computer for to perform a method of controlling a communication apparatus, the method comprising:
performing a process for acquiring first information from a repeater apparatus, wherein the acquisition unit performs a process for acquiring the first information from the repeater apparatus after a Hot Plug Detect (HPD) signal is changed to a high level from a low level, wherein the first information includes information for generating video data;
performing a process for acquiring second information from the repeater apparatus if a predetermined state of an external apparatus, connected to the repeater apparatus, is changed to a first state from a second state after the first information is acquired from the repeater apparatus, wherein the second information includes information for generating video data, the first state is a state that an external apparatus, connected to the repeater apparatus, displays video data to be transmitted from the repeater apparatus, and the second state is a state that an external apparatus, connected to the repeater apparatus, does not display video data to be transmitted from the repeater apparatus, and transmitting video data to an external apparatus, connected to the repeater apparatus, via the repeater apparatus.

12. The non-transitory recording medium according to claim 11, wherein the first information includes one of extended display identification data (EDID) and enhanced EDID (E-EDID), and wherein the second information includes one of EDID and E-EDID.

13. The non-transitory recording medium according to claim 11, further comprising:
   performing a process for transmitting video data generated based on the first information if the first information corresponds to the second information.

14. The non-transitory recording medium according to claim 11, further comprising:
   performing a process for transmitting video data generated based on the second information without transmitting video data generated based on the first information if the first information does not correspond to the second information.

15. The non-transitory recording medium according to claim 11, wherein the communication apparatus conforms to Transition Minimized Differential Signaling (TMDS).

16. The communication apparatus according to claim 1, further comprising a determining unit that determines that the predetermined state is the first state if a transmission line is connected to a terminal resistor of an external apparatus, wherein the determining unit determines that the predetermined state is the second state if the transmission line is not connected to the terminal resistor, and wherein the repeater apparatus transmits video data to an external apparatus, connected to the repeater apparatus, via the transmission line.

17. The method according to claim 6, further comprising:
   determining that the predetermined state is the first state if a transmission line is connected to a terminal resistor of an external apparatus; and
   determining that the predetermined state is the second state if the transmission line is not connected to the terminal resistor,
   wherein the repeater apparatus transmits video data to an external apparatus, connected to the repeater apparatus, via the transmission line.

18. The non-transitory recording medium according to claim 11, further comprising
   determining that the predetermined state is the first state if a transmission line is connected to a terminal resistor of an external apparatus; and
   determining that the predetermined state is the second state if the transmission line is not connected to the terminal resistor,
   wherein the repeater apparatus transmits video data to an external apparatus, connected to the repeater apparatus, via the transmission line.

* * * * *